United States Patent [19]

Turner et al.

[11] 4,347,013

[45] Aug. 31, 1982

[54] MOUNTING DEPTH-FINDERS, OR FISH FINDERS

[76] Inventors: William A. Turner, 2704 First St.; Johnny R. Nunnelee, Rte. 1, Box 223 Hillcrest Dr., both of Gadsden, Ala. 35901

[21] Appl. No.: 100,686

[22] Filed: Dec. 5, 1979

Related U.S. Application Data

[62] Division of Ser. No. 941,650, Sep. 11, 1978, abandoned.

[51] Int. Cl.³ ............................ F16B 7/00; F16D 1/10
[52] U.S. Cl. ............................................. 403/4; 29/453; 29/434; 248/186; 248/187; 248/667; 403/359; 403/361; 403/103; 464/162
[58] Field of Search ............... 29/453, 436, 434; 285/DIG. 22; 403/359, 361, 315, 320, 166, 4, 103, 328, 3; 248/557, 186, 514, 187, 667; 64/29, 15

[56] References Cited

U.S. PATENT DOCUMENTS

| 2,220,610 | 11/1940 | Miller | 403/359 |
| 2,501,648 | 3/1950 | Ogden | 64/29 |
| 2,831,383 | 4/1958 | Riess | 64/29 X |
| 2,894,779 | 7/1959 | Kushner et al. | 403/166 X |
| 2,926,034 | 2/1960 | Weaver | 403/359 X |
| 2,949,304 | 8/1960 | Williams | 403/359 X |
| 3,049,366 | 8/1962 | Peters | 29/453 UX |
| 3,061,341 | 10/1962 | Grzych et al. | 403/359 X |
| 3,335,580 | 8/1967 | Simpson, Jr. | 403/359 X |
| 3,425,406 | 2/1969 | Mejyr | 403/103 X |
| 3,551,013 | 12/1970 | Trojanowski et al. | 403/359 X |
| 3,948,547 | 4/1976 | Gache | 403/328 |

FOREIGN PATENT DOCUMENTS 1047025 12/1953 France .................................. 64/29

*Primary Examiner*—Charlie T. Moon
*Attorney, Agent, or Firm*—Beveridge, De Grandi & Kline

[57] ABSTRACT

A swivel mounting device comprising a male member having an attachment portion, and a stem portion having a plurality of longitudinal first grooves therein and a second circumferentially extending groove therein; and a female member having a recess therein to receive the male stem portion and having a spring loaded pawl member for engaging one of the male member first grooves while permitting ratcheting rotation between the male and female members, and a plurality of spring loaded slide members for engaging the male member second groove to releasably retain the male member and female member together.

4 Claims, 1 Drawing Figure

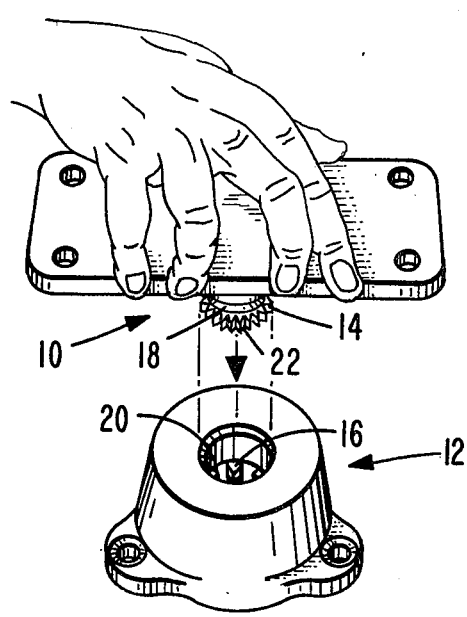

MOUNTING DEPTH-FINDERS, OR FISH FINDERS

This is a division of application Ser. No. 941,650, filed Sept. 11, 1978, now abandoned.

BRIEF SUMMARY OF THE INVENTION

With the increasing use of electronic devices by fishermen, the need for practical ways to mount them has also increased. This swivel mount is needed to give the fisherman a way to read his depth finder while driving his boat and when he arrives at his fishing place, he can swivel the depth finder to the desired angle to read easily while fishing. The snap on and off feature of the mount is the desired way of removing the depth finder from the boat.

DESCRIPTION OF THE DRAWING

The swivel mount is made of two primary parts, the top or male 10, which mounts to the depth finder, and the bottom or female 12, which mounts to the boat.

The end of the male part is made with 30 vertical "V" grooves 14 which engage with a mating "V" spring loaded ratchet 16 which gives positive location every 12 degrees.

Immediately above the ratchet grooves in the male part is a horizontal "V" groove 18 which engage with 3 mating springloaded slides 20 which hold the mount securely together.

When the two parts 10 and 12 are put together, a 45 degree angle on the end 22 of the male part 10 cams back the 3 spring loaded slides 20 which snap back into a 90 degree included angle and hold the parts 10 and 12 securely together until taken apart by a pull straight upward. When the two parts 10 and 12 are put together, the 45 degree angle on end 22 of male part 10 cams back the spring loaded ratchet tooth 16 which has a 90 degree vertical point which mates in one of the 30 vertical "V" grooves 14 to give positive positioning every 12 degrees. On mounting of a depth finder to a boat, the depth finder can ratchet 360 degrees.

What is claimed is:

1. A swivel mounting device comprising:
    a male member including an attachment portion, adapted for attachment to a depth finder or the like, and a stem portion, extending from the attachment portion and having a plurality of first grooves therein, extending longitudinally of the stem portion, and a second groove therein, extending circumferentially around the stem portion between the first grooves and the attachment portion; and
    a female member adapted for attachment to a boat or the like and having a recess adapted to receive the male member stem portion and including therein (a) a spring loaded pawl member for engaging one of the male member first grooves while permitting ratcheting rotation between the male member and the female member, and (b) three spring loaded slide members for engaging the male member second groove to releasably retain the male member and the female member together.

2. A swivel mounting device as claimed in claim 1 in which the end of the male member stem portion remote from the attachment portion includes a 45° bevel for camming back the female member pawl member and slide members on insertion of the male member stem portion into the female member recess.

3. A swivel mounting device as claimed in claim 1 in which the male member stem portion has 30 first grooves therein, permitting positive positioning every 12 degrees during ratcheting rotation between the male member and the female member.

4. A swivel mounting device as claimed in any one of claims 1, 2, or 3 in which said spring loaded slide members are adapted to snap into a 90 degree included angle to engage said second groove of said male member, thereby requiring a pull straight upward to separate said male and female members.

* * * * *